US012810721B2

(12) United States Patent
Garrett et al.

(10) Patent No.: US 12,810,721 B2
(45) Date of Patent: Nov. 24, 2026

(54) COMBINE HARVESTER WITH TRAFFIC DETECTION

(71) Applicant: CNH Industrial America LLC, New Holland, PA (US)

(72) Inventors: Robert Garrett, Conestoga, PA (US); Scott Deichmann, Phoenixville, PA (US); Zachary Harmon, Robesonia, PA (US); Seth Woodward, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 309 days.

(21) Appl. No.: 18/609,347

(22) Filed: Mar. 19, 2024

(65) Prior Publication Data

US 2024/0321085 A1 Sep. 26, 2024

(30) Foreign Application Priority Data

Mar. 20, 2023 (EP) .................................... 23162821

(51) Int. Cl.

| | |
|---|---|
| ***G08G 1/01*** | (2006.01) |
| ***A01D 41/12*** | (2006.01) |
| ***A01D 41/127*** | (2006.01) |
| ***G01S 13/931*** | (2020.01) |
| ***G08G 1/052*** | (2006.01) |

(52) U.S. Cl.

CPC ....... *G08G 1/0112* (2013.01); *A01D 41/1243* (2013.01); *A01D 41/127* (2013.01); *G01S 13/931* (2013.01); *G08G 1/052* (2013.01)

(58) Field of Classification Search

CPC .. G08G 1/0112; G08G 1/052; A01D 41/1243; A01D 41/127; G01S 13/931; B60W 2300/158

USPC ........................................................... 701/50

See application file for complete search history.

(56) References Cited

U.S. PATENT DOCUMENTS

| | | | | |
|---|---|---|---|---|
| 2017/0086377 | A1* | 3/2017 | Jongmans | G01S 13/93 |
| 2021/0015039 | A1* | 1/2021 | Vandike | G06V 20/56 |
| 2021/0122368 | A1* | 4/2021 | Ikic | B60W 30/095 |
| 2021/0127573 | A1* | 5/2021 | Mahieu | A01D 41/1243 |
| 2021/0144924 | A1* | 5/2021 | Schrag | A01D 41/127 |
| 2021/0293001 | A1* | 9/2021 | Bares | E02F 9/265 |

(Continued)

FOREIGN PATENT DOCUMENTS

| | | |
|---|---|---|
| EP | 3816968 A1 | 5/2021 |
| EP | 4212003 A1 | 7/2023 |

OTHER PUBLICATIONS

European Search Report Corresponding to EP23162821 on Aug. 29, 2023.

*Primary Examiner* — Hitesh Patel
*Assistant Examiner* — John D Holman
(74) *Attorney, Agent, or Firm* — Dority & Manning, P.A.

(57) ABSTRACT

A combine harvester with a chopper for chopping residue straw, and a spreader system for spreading the chopped residue straw in an area behind the combine harvester. The combine harvester further includes a radar-based residue monitoring system for monitoring a spreading distribution of the chopped residue straw. A controller is configured to receive sensor signals from one or more radar sensors of the radar-based residue monitoring system, to detect a presence of the nearby vehicle based on the received sensor signals, and to generate a warning signal in dependence of the presence of the nearby vehicle.

13 Claims, 4 Drawing Sheets

(56) References Cited

U.S. PATENT DOCUMENTS

| | | | | |
|---|---|---|---|---|
| 2021/0400870 | A1* | 12/2021 | Sunil | G01N 33/0098 |
| 2022/0394923 | A1* | 12/2022 | Christiansen | A01D 41/127 |
| 2023/0270049 | A1* | 8/2023 | Vandike | A01D 45/021<br>56/314 |

* cited by examiner

COMBINE HARVESTER WITH TRAFFIC DETECTION

CROSS-REFERENCE TO RELATED APPLICATIONS

The present application is based upon and claims the right of priority to EP Patent Application Number 23162821.5, filed Mar. 20, 2023, the disclosure of which is hereby incorporated by reference herein in its entirety for all purposes.

TECHNICAL FIELD

The present invention relates to a combine harvester comprising a grain tank for storing harvested grain, a chopper for chopping residue straw, and a spreader system for spreading the chopped residue straw in an area behind the combine harvester. The present invention further relates to a method and software for controlling such a combine harvester.

BACKGROUND

Combine harvesters are complex machines with many structural and functional parts, arranged to perform a plurality of different functions related to the harvesting of grain and grain-like crops. The main functions of a combine harvester include the cutting and taking in of the crop, threshing the grains from the stalks in a threshing section, separating the chaff from the grain kernels in a cleaning section, and releasing the straw and chaff residue from the harvester.

The cleaned grain is typically stored in a large grain tank that is periodically emptied through an unload conveyor into a grain hauling vehicle. The unloading of the grain tank may, for example, happen at the edge of the field, while standing still, or while harvesting in the field with the grain hauling vehicle driving next to the combine harvester. The grain hauling vehicle usually is a grain cart or large trailer pulled by a tractor, but could be a truck with a large loading space, or any other type of drivable loading space suitable for receiving large volumes of grain.

The release of straw residue behind the combine harvester may be done by dropping the straw in a swath on the field, for example to allow it being picked up by a baler machine later. Often, however, the straw residue is chopped into smaller pieces and spread over the field across the full width of the header, together with the chaff coming from the cleaning section. When spread over the field, the residue crop material serves as fertilizer for the soil. In the international patent application published as WO 2018/162699 A1, the use of radar sensors, installed at the rear of the harvester, below the spreader system, is disclosed for monitoring the particle size and spatial distribution of the chopped and expelled residue particles.

In the combine harvester described in WO 2015/177188 A1, radar sensors are placed at lateral sides of the harvester body for detecting persons and other obstacle detection appearing in a danger zone around the harvester. WO 2019/215185 A1 and EP 3 939 403 A1 describe the use of a radar sensor provided in or at a side panel of the harvester body, just underneath the unloading tube, for monitoring the grain unloading process.

The increasing use of such high-tech sensing systems adds to the cost and complexity of modern agricultural harvesters and may bring increased maintenance costs and downtime for repairs It is an aim of the present invention to address one or more disadvantages associated with the prior art.

SUMMARY OF THE INVENTION

According to an aspect of the invention there is provided a combine harvester with a chopper for chopping residue straw, and a spreader system for spreading the chopped residue straw in an area behind the combine harvester. The combine harvester further comprises a radar-based residue monitoring system for monitoring a spreading distribution of the chopped residue straw. A controller is configured to receive sensor signals from one or more radar sensors of the radar-based residue monitoring system, to detect a presence of a nearby vehicle based on the received sensor signals, and to generate a warning signal in dependence of the presence of the nearby vehicle.

With the radar-based residue monitoring system according to the invention, the combine harvester makes optimal use of the availability and technical capabilities of the radar sensors in the residue monitoring system. The inventors have realised that, even though these already available radar sensors may primarily be provided and configured for monitoring the performance of the residue spreaders, they can be configured to be very useful for improved safety when driving on roads. For example, the radar sensors of the radar-based residue monitoring system may be used for detecting the presence of passing vehicles and providing a timely warning to the driver of the combine harvester about such passing vehicles. In recent decades, with the advancement of technology, and an increased focus on the efficient use of expensive agricultural machinery, the size of combine harvesters has been increasing. As a result, it has become more difficult to safely drive the combine harvester on public roads while avoiding damage to the combine harvester, other road users, roadside vegetation, and other obstacles. The relatively low speed of combine harvesters compared to the usual driving speed of many other road users often causes such other road users to attempt to pass the combine harvesters. On country roads, where there can be oncoming traffic and such passing manoeuvres can be unsafe, also because the large size of the combine harvester may block large portions of the view of the driver of the passing vehicle. It thus is of high importance that the driver of the combine harvester becomes aware of the presence of a passing vehicle as soon as possible, such that collisions can be avoided. With the system according to the invention, the driver of the combine harvester will get an early warning of the presence of a nearby vehicle, even when it is not yet visible from the combine harvester driver cabin.

Preferably, the controller is further configured to determine not just the presence but also a position and/or a driving speed of the nearby vehicle relative to the combine harvester, based on the received sensor signals. When knowing the exact position of the nearby, possibly passing, vehicle relative to the combine harvester, this can, e.g., be shown to the driver on a display screen, thereby enabling the driver to steer or decelerate the combine harvester in a safety-enhancing manner. By determining the driving speed of the nearby vehicle, the system is further enabled to differentiate between passing vehicles and other objects or vehicles, such as parked cars or vehicles traveling in the opposite direction. In preferred embodiments, the controller is therefore further configured to generate the warning signal in dependence of the position and/or the driving speed of the nearby vehicle.

In some embodiments, the radar-based residue monitoring system may be configured to be operated in one of at least two distinct detection modes, i.e., a spreader mode and a non-spreader mode. In the spreader mode, the radar-based residue monitoring system is configured to emit a radar signal with a waveform adapted for monitoring the spreading distribution of the chopped residue straw. In the non-spreader mode, the radar-based residue monitoring system is configured to emit a radar signal with a waveform adapted for detecting vehicles.

Radar systems especially configured to detect small, fast moving objects like chopped straw from a residue spreader may not be optimally configured to detect larger objects moving at relatively low speeds relative to the radar system. According to embodiments of the invention, the radar-based residue monitoring system may run in the spreader mode while the combine is harvesting crop and chopping and spreading the crop residue over the field. Upon, for example, a user command or an initial detection of the a presence or possible presence of a nearby vehicle by the radar-based residue monitoring system, the controller may reconfigure the radar-based residue monitoring system to switch to the non-spreader mode.

In preferred embodiments, the non-spreader mode is a road mode and the combine harvester further comprises a road travel detection system, configured to detect when the combine harvester is driving on a road, the controller being configured to switch the radar-based residue monitoring system to the road mode when detecting that the combine harvester is driving on the road. The road travel detection system may, e.g., comprise a video camera, a vibration sensor, or a geolocation sensor. Image recognition software may be used to detect the presence of nearby vehicles in video images captured by the video camera. Road surfaces are typically smoother than the agricultural fields wherein the combine harvester performs its harvesting operations and are thus characterised by different vibration patterns that can be detected by one or more vibration sensors. Topographical data of the region where the combine harvester is used may indicate the location of roads and fields, thereby allowing the controller of the combine harvester to switch the radar-based residue monitoring system to the road mode when the geolocation sensor indicates that the combine harvester is driving on a road. Because the combine harvester driving speed on the road will typically be higher than its driving speed in the field, also speed sensors may be used for determining when the combine harvester is driving on a road. Preferably, a combination of different types of sensors is used for determining when to switch the radar-based residue monitoring system to the road mode.

According to a further aspect of the invention, a method and software is provided for controlling a combine harvester. The method comprises receiving sensor signals from one or more radar sensors of a radar-based residue monitoring system of the combine harvester, based on the received sensor signals detecting a presence of a nearby vehicle, and generating a warning signal in dependence of the presence of the nearby vehicle.

BRIEF DESCRIPTION OF THE DRAWINGS

Embodiments of the invention will now be described by way of example with reference to the accompanying drawings, in which.

DETAILED DESCRIPTION

Figure 1:
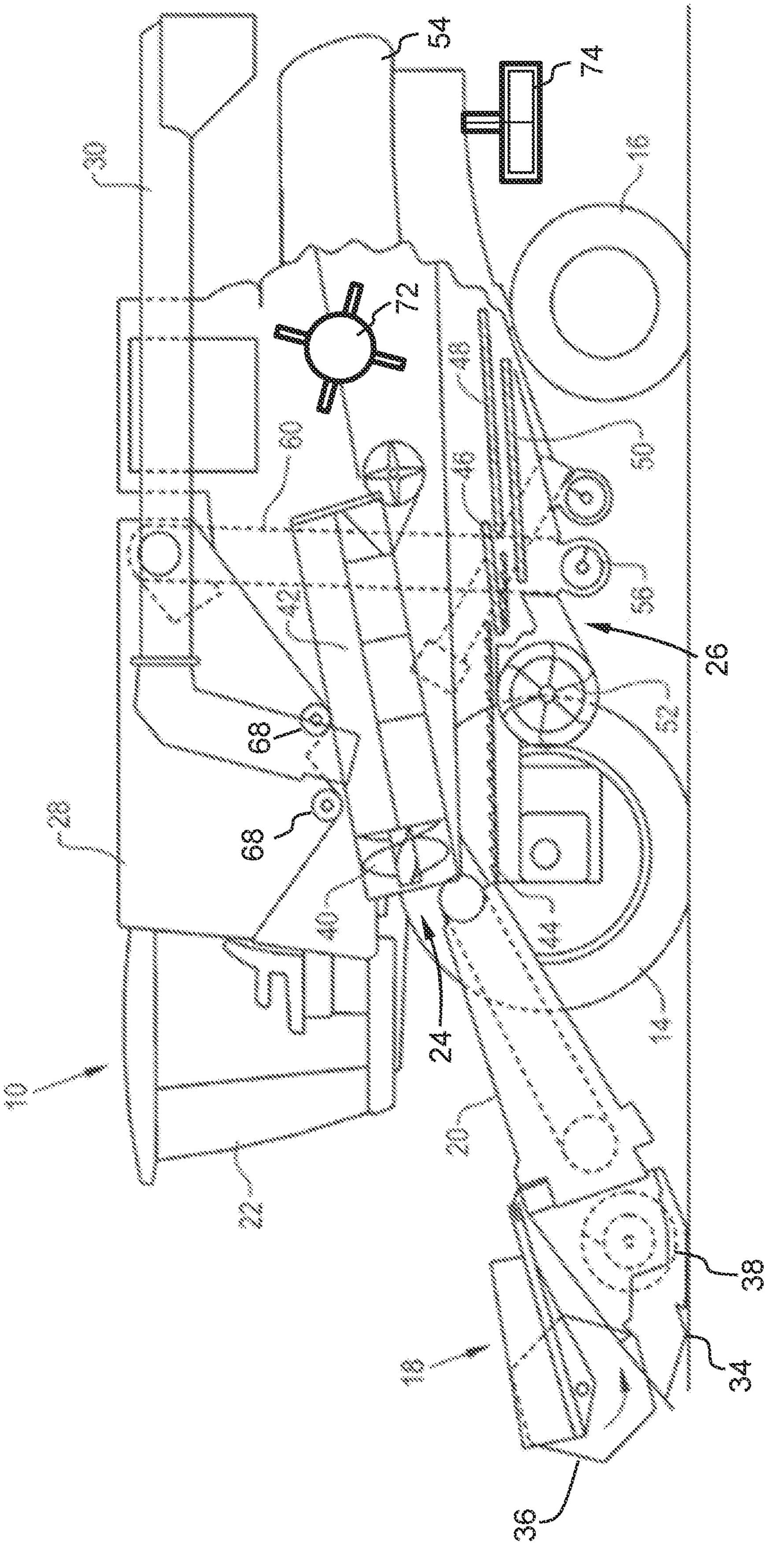
FIG. 1 schematically shows a combine harvester wherein the invention may be advantageously used.

FIG. 1 schematically shows an agricultural harvester in the form of a combine harvester 10. The combine harvester 10 generally includes front and rear round engaging wheels 14, 16, a header 18, a feeder 20, an operator cabin 22, a threshing and separation system 24, a cleaning system 26, a grain tank 28 and an unloading tube 30.

A header 18 is mounted to the front of the combine harvester 10 and includes a cutter bar 34 for severing crops from a field during forward motion of the combine. A rotatable reel 36 feeds the crop into the header 18, and a double auger 38 feeds the severed crop laterally from each side towards the feeder 20. The feeder 20 conveys the severed crop to the threshing and separation system 24.

The threshing and separation system 24 is of the axial-flow type and comprises a threshing rotor 40 at least partially located and rotatable within a threshing concave 42. The threshing concave may take the form of a perforated concave. Grain from the severed crop is threshed and separated from the material other than grain (MOG) by the action of the threshing rotor 40 within the threshing concave 42. Larger elements of MOG, such as stalks and leaves do not pass through the perforations in the threshing concave 42 and are discharged from the rear of the combine harvester 10.

The release of straw residue behind the combine harvester 10 may be done by dropping the straw in a swath on the field, for example to allow it being picked up by a baler machine later. Often, however, the straw residue is chopped into smaller pieces by a chopper 72 and spread over the field across the full width of the header 18 by a spreader system 74. The spreader system 74 typically comprises a left and a right rotary spreader, each spreading the chopped crop residue received from the chopper 72 laterally and away from the combine harvester 10. The chaff and other small MOG coming from the cleaning system 26 may be dropped on the field, spread over the field by a separate chaff spreader (not shown), or mixed in with the straw residue to be spread together therewith by the spreader system 74. The straw, chaff, and other MOG that is spread over the field serves as fertilizer for the soil.

Grain and smaller elements of MOG (small MOG henceforth), such as chaff, dust and straw are small enough to pass through the perforations in the threshing concave 42. Grain and small MOG that has successfully passed the threshing and separation system 24 falls onto a preparation pan 44 and is conveyed towards the cleaning system 26. The cleaning system comprises a series of sieves and a cleaning fan 52. The series of sieves includes a pre-cleaning sieve 46, an upper (or chaffer) sieve 48 and a lower (or shoe) sieve 50. The cleaning fan 52 generates an airflow through the sieves 46, 48, 50 that impinges on the grain and small MOG thereon. The small MOG is typically lighter than the grain and is therefore separated from the grain as it becomes airborne. The small MOG is subsequently discharged from the combine harvester 10 via a straw hood 54.

The preparation pan 44 and pre-cleaning sieve 46 oscillate in a fore-to-aft manner to transport the grain and small MOG to the upper surface of the upper sieve 48. The upper sieve 48 is arranged vertically above the lower sieve 50 and oscillates in a for-to-aft manner too, such that the grain and small MOG are spread across the two sieves 48, 50, while also permitting cleaned grain to pass through openings in the sieves 48, 50 under the action of gravity.

Cleaned grain falls to a clean grain auger 56 that is positioned below and in front of the lower sieve 50 and spans the width of the combine harvester 10. The clean grain auger 56 conveys the cleaned grain laterally to a vertical grain elevator 60, which is arranged to transport the cleaned grain to the grain tank 28. Once in the grain tank 28, grain tank augers 68 at the bottom of the grain tank convey the cleaned grain laterally within the grain tank 28 to an unloading tube 30 for discharge from the combine harvester 10.

Figure 2:
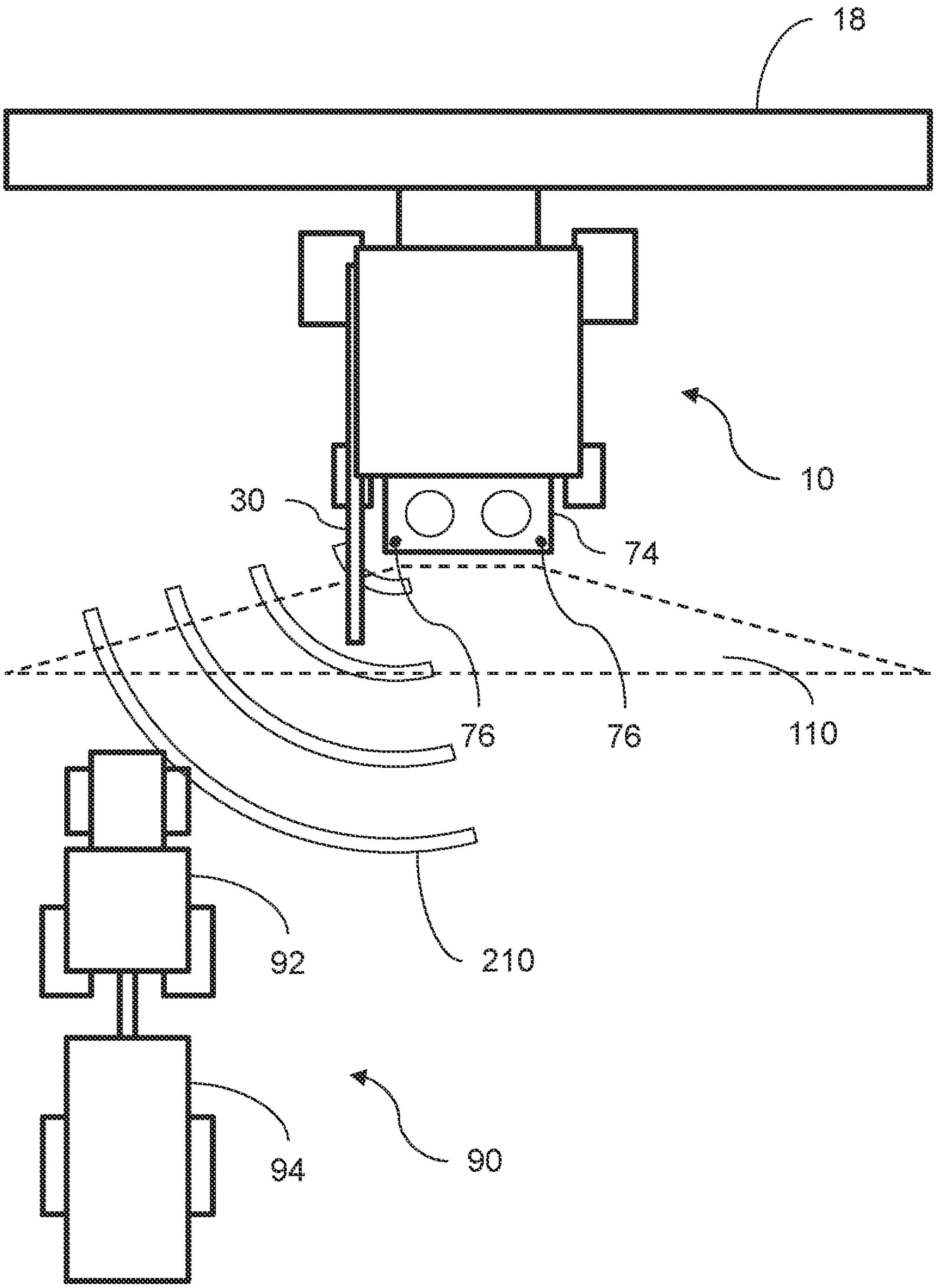
FIG. 2 schematically shows a grain hauling vehicle approaching the combine harvester for collecting clean grain stored in the grain tank of the combine harvester.

FIG. 2 schematically shows a grain hauling vehicle 90 approaching the combine harvester 10 for collecting clean grain stored in the grain tank 28 of the combine harvester 10. In this exemplary embodiment, the grain hauling vehicle 90 is a combination of a large trailer 94 and a tractor 92 pulling the trailer 94. In the following, the term grain hauling vehicle 90 will be used for any tractor-trailer combination, self-driving loading truck, or other type of drivable loading space used for the purpose of first receiving grain from the grain tank 28 of a combine harvester 10, and then transporting the collected grain away from the field to a larger grain storage facility.

The combine harvester 10 drives forward while its header 18 cuts and takes in the crop standing in the field in front of the harvester 10. The spreader system 74 spreads the chopped straw over a spreading area 110 behind the combine harvester 10. A radar-based residue monitoring system comprises two radar sensors 76 that are positioned and configured to monitor the dispersed crop residue. In alternative embodiments, the radar-based residue monitoring system may comprise only one or three or more radar sensors 76. Aspects of the residue spreading that may be monitored include particle size, particle size distribution, a width of the spreading area 110, and a distribution of the residue particles over the full width of the spreading area 110. Preferably, a controller of the combine harvester 10 is operable to control straw chopper 72 in such a way to cut the crop residue into pieces of the desired particle size. Further, the controller may control the spreader system 74 in such a way that the spreading area 110 extends along the complete width of the header 18.

As the grain hauling vehicle 90 approaches the combine harvester 10 from behind, it moves into the field of view of the radar-based residue monitoring system. Radar signals 210 emitted by the radar sensors 76 are then reflected by the grain hauling vehicle 90 and the return signals can be picked up by these radar sensors 76. According to the invention, a controller of the combine harvester 10 is configured to detect the presence of the nearby grain hauling vehicle 90 based on the received sensor signals from the radar sensors 76. The controller may be capable of detecting the grain hauling vehicle 90 using the normal radar signals 210, even though they may be optimised for detecting small, fast moving residue particles. Optionally, the radar sensors 76 are controlled to intermittently emit radar signals 210 with a waveform especially adapted for detecting slow moving vehicles 90. For example, the radar sensors 76 may be operated in the spreader mode for ten cycles, followed by one or two cycles of operation in the non-spreader mode. As soon as the presence of a grain hauling vehicle 90 or other obstacle is detected, the number of cycles of operation in each mode may be adjusted, or the radar sensors 76 may be controlled to operate in the non-spreader mode continuously until the grain hauling vehicle 76 has moved away from the combine harvester 10.

When detecting the presence of a grain hauling vehicle 90 in the direct vicinity of the combine harvester 10, the controller may, for example, provide a warning signal to the driver, set up a direct communication signal between the combine harvester 10 and the grain hauling vehicle 90, or automatically control one or more functional parts of the vehicles 10, 90 in order to avoid damage or to prepare the relevant systems for an upcoming grain transfer from the grain tank 28 to the trailer 94 of the hauling vehicle 90. The warning signal may, e.g., be shown on a display inside the driver cabin 22 and accompanied by an audible signal to draw the driver's attention to the presence of the grain hauling vehicle 90. By setting up or activating a direct communication channel between the drivers of the two vehicles 10, 90, it will be made easier to properly coordinate the movement of both vehicles 10, 90 in order to avoid collisions and provide a smooth transfer of grain from the grain tank 28 into the trailer 94 of the hauling vehicle 90.

Preferably, the controller is further configured to determine not just the presence but also a position of the nearby grain hauling vehicle 90 relative to the combine harvester 10. When knowing the exact position of the grain hauling vehicle 90, this can, e.g., be used for guiding the grain hauling vehicle 90 and facilitating the process of unloading the content of the grain tank into the grain hauling vehicle, without unnecessary grain loss or damage to one of the vehicles 10, 90.

While the vehicle guidance may be provided in the form of position information and/or driving instructions presented to the drivers of both vehicles, the controller may advantageously be configured to control a driving speed and/or a driving direction of the combine harvester and/or the nearby grain hauling vehicle, in dependence of the relative position of the nearby grain hauling vehicle. When the travel paths of one or both of the vehicles 10, 90 are controlled by autonomous or semi-autonomous driving systems, direct communication between the driving systems of both vehicles 10, 90 may improve the responsiveness and accuracy of both driving systems.

In preferred embodiments, the controller is further configured to control an orientation of the unload conveyor 30 relative to the grain tank 28, in dependence of the relative position of the nearby grain hauling vehicle 90. The control of the orientation of the grain conveyor 30, possibly in combination with the control of the relative positions of the combine harvester 10 and the grain hauling vehicle 90, helps to improve the efficiency and accuracy of the unloading process while reducing the risk of collision. For example, the controller of the combine harvester 10 may instruct to start deploying the unload conveyor 30 as soon as the hauling vehicle 90 is detected to be approaching. This deployment of the unload conveyor may be made dependent on a current filling level of the grain tank 28, or subject to a confirmation by the driver that a grain unloading process is to be initiated.

In further preferred embodiments of the combine harvester 10 according to the invention, the controller is further configured to control an operation of the spreader system 74, in dependence of the presence of the nearby grain hauling vehicle. 90. For example, the spreader system 74 or one of two spreaders of the spreader system 74 may be turned off when the grain hauling vehicle 90 moves into the spreading region 110 of the combine harvester 10. This way, it may be avoided that the grain hauling vehicle 90 is soiled or damaged by the spray of chopped crop residue coming from the spreaders 74. Furthermore, temporarily turning off the spreaders 74 may help to improve vision for the driver, or the camera systems, of the grain hauling vehicle 90 while approaching or driving through the dusty clouds of chopped straw. Instead of completely turning off the spreader system 74, as e.g. shown in FIG. 3, the controller may adjust the spreader direction or turn off only the spreader at the side of the combine harvester 10 where the grain hauling vehicle 90 is detected while continuing to spread chopped crop residue at the other side.

In some embodiments, the radar-based residue monitoring system may be configured to be operated in one of at least two distinct detection modes, i.e., a spreader mode and a non-spreader mode. In the spreader mode, the radar-based residue monitoring system is configured to emit a radar signal 210 with a waveform adapted for monitoring the spreading distribution of the chopped residue straw. In the non-spreader mode, the radar-based residue monitoring system is configured to emit a radar signal 210 with a waveform adapted for detecting vehicles or stationary obstacles.

Radar systems especially configured to detect small, fast moving objects like chopped straw from a residue spreader 74 may not be optimally configured to detect larger objects moving at relatively low speeds relative to the radar system. According to embodiments of the invention, the radar-based residue monitoring system may run in the spreader mode while the combine 10 is harvesting crop and chopping and spreading the crop residue over the field. Upon, for example, a user command, a signal from an approaching grain hauling vehicle 90, or an initial detection of the grain hauling vehicle 90 by the radar-based residue monitoring system, the controller may reconfigure the radar-based residue monitoring system to switch to the non-spreader mode, possibly in combination with pausing or redirecting the residue spreading. Alternatively, the non-spreader mode may be used only for very short periods of time without interrupting the operation of the spreader system 74. Such short periods of time in the non-spreader mode may be long enough to reliably detect the presence and position of the grain hauling vehicle 90. Even when used frequently, the short duration of the periods in the non-spreader mode will ensure that the proper functioning of the radar-based residue monitoring system is not adversely affected. For example, the radar sensors 76 may be operated in the spreader mode for ten cycles, followed by one or two cycles of operation in the non-spreader mode. When the radar-based residue monitoring system comprises multiple radar sensors 76, only a subset may be put into the non-spreader mode. The non-spreader mode 76 may be used primarily at the side of the combine harvester 10 where the unload conveyor 30 is located, because this is the side where the grain hauling vehicle 90 is expected to appear.

When the grain unloading process is completed and the grain hauling vehicle 90 moves away from the combine harvester 10, the combine harvester can resume its normal harvesting operation and the controller may bring the radar-based residue monitoring system back into the spreader-mode.

In addition to the use of the radar-based sensor system for detecting the presence or position of grain hauling vehicles 90, the radar sensors 76 may be made available for use in other ways, not directly related to measuring the particle size and spreading distribution of chopped crop residue. For example, the radar sensors 76 may be used as parking sensors while driving in reverse, or for detecting a lateral distance to standing crop to assist in steering the combine harvester 10 or determining an optimal spreading width.

Figure 3:
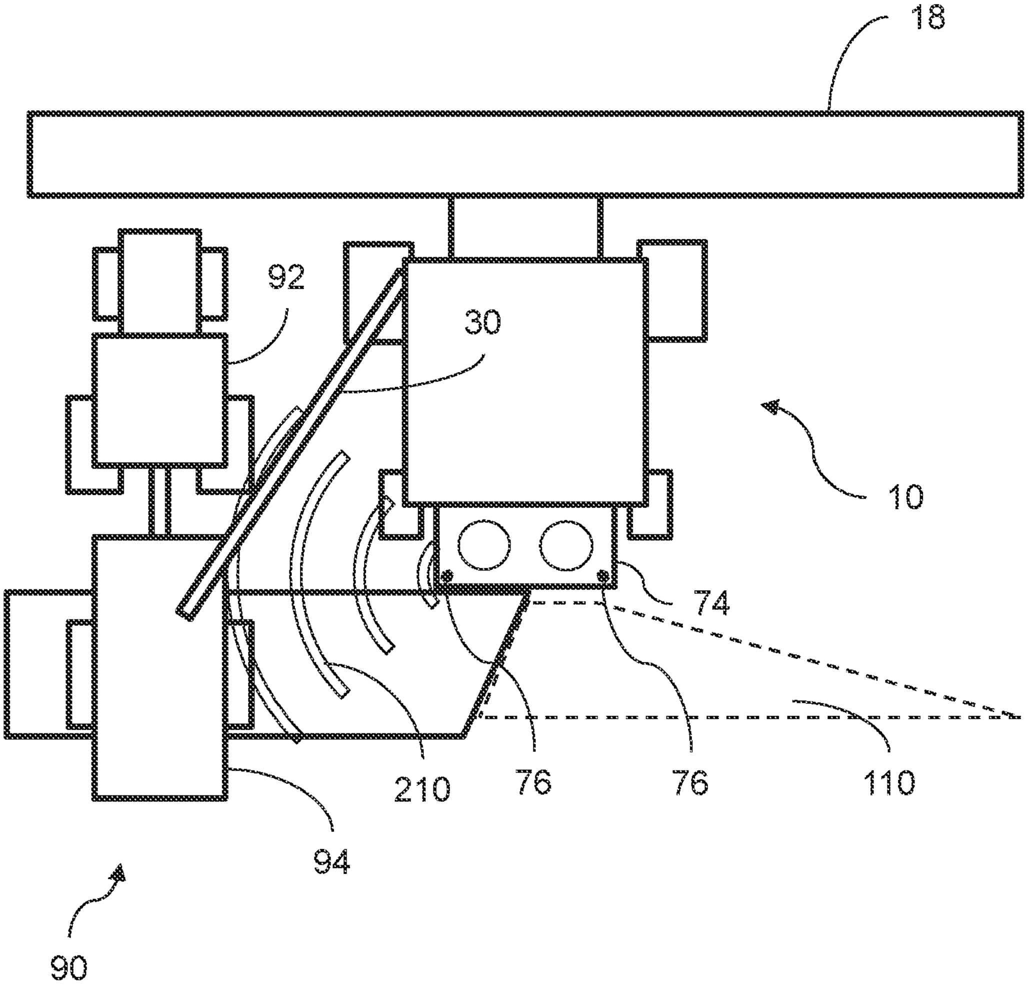
FIG. 3 schematically shows a grain hauling vehicle driving adjacent the combine harvester while receiving clean grain being unloaded from the grain tank of the combine harvester.

FIG. 3 schematically shows a grain hauling vehicle 90 driving adjacent the combine harvester 10 while receiving clean grain being unloaded from the grain tank 28 of the combine harvester 10. The relative position of the grain hauling vehicle 90, as detected with the use of one of the radar sensors 76 of the residue monitoring system, may be used to automatically or semi-automatically control the speed and direction of the combine harvester 10 and the tractor 92 pulling the trailer 94. In addition thereto, this information may be used to control the orientation of the unload conveyor 30 too. The operation of the spreader system 74 is temporarily adjusted to ensure that the spreading region 110 does not include the area where the grain hauling vehicle 90 is located. This may, e.g., be achieved by only using one of its two rotary spreaders, or by running the one nearest to the grain hauling vehicle 90 at a very low rotational speed. Because the spreader system 74 is spreading the chopped crop residue to one side of the combine harvester 10 only, the radar sensor 76 at the grain hauling vehicle side of the combine harvester 76 may be put into the non-spreader mode, while the radar sensor 76 at the other side is kept in the spreader mode.

Figure 4:
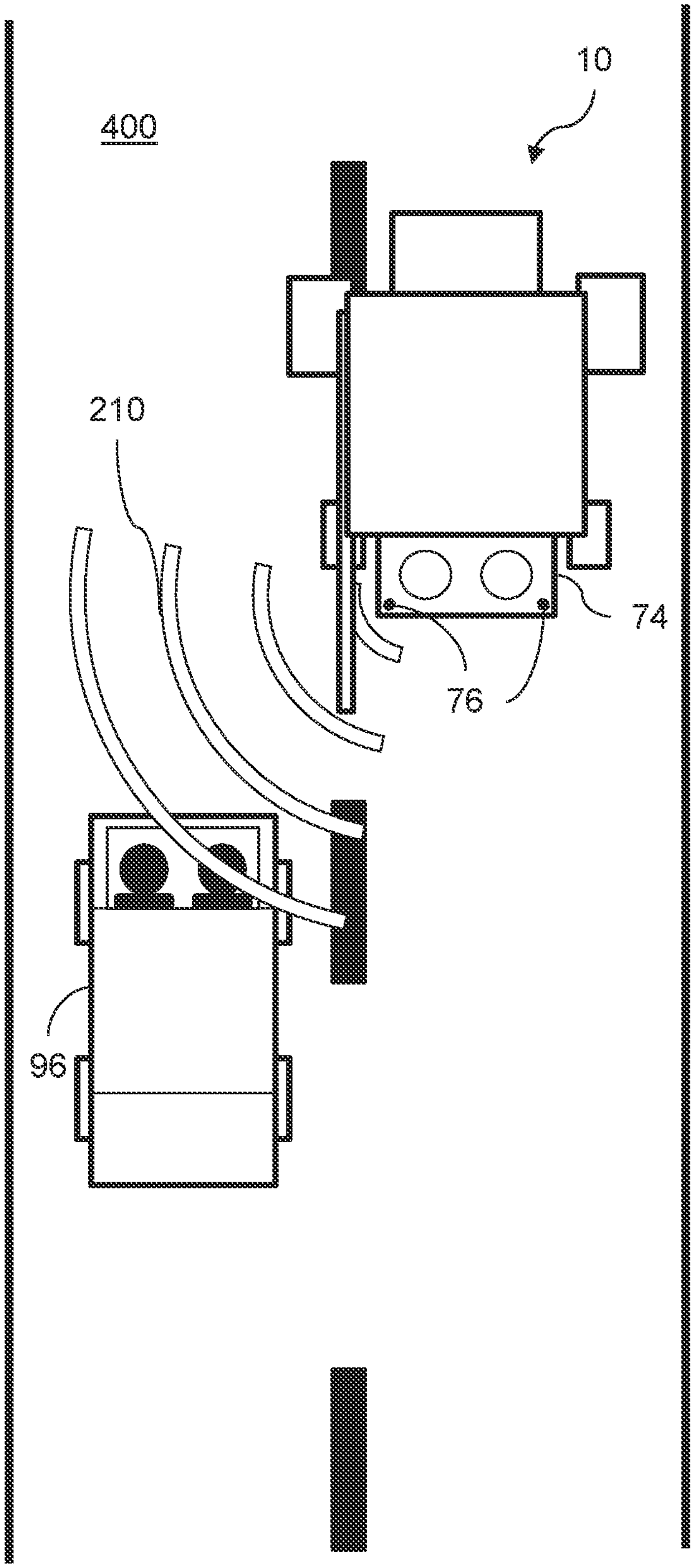
FIG. 4 schematically shows a combine harvester driving on a road while being passed by a car.

FIG. 4 schematically shows a combine harvester 10 driving on a road 400 while being passed by a car 96. When out of the field and on the road 400, the combine harvester 10 usually does not have a header 18 to its feeder. The header may be transported separately by a tractor pulling a header supporting trailer, or such a trailer may be attached to the rear of the combine harvester 10 itself. Alternatively, the header 18 may comprise one or more transport wheels for supporting the header 18 during road transport, such that no separate trailer is needed.

When driving on the road 400, the radar sensors 76 of the combine harvester 10 are not needed for monitoring the performance of the residue spreaders 74. Consequently these sensors 76 can now be used for improving the safety of the driver of the combine harvester 10 and other people on the road, such as the driver and passenger of the car 96 shown in FIG. 4. For example, the radar sensors 76 of the radar-based residue monitoring system may be used for detecting the presence of the passing vehicle 96 and providing a timely warning to the driver of the combine harvester 10 about such passing vehicles 96. In recent decades, with the advancement of technology, and an increased focus on the efficient use of expensive agricultural machinery, the size of combine harvesters 10 has been increasing. As a result, it has become more difficult to safely drive the combine harvester 10 on public roads 400 while avoiding damage to the combine harvester 10, other road users 96, roadside vegetation, and other obstacles. The relatively low speed of combine harvesters 10 compared to the usual driving speed of many other road users 96 often causes such other road users 96 to attempt to pass the combine harvesters 10. On country roads 400, where there can be oncoming traffic and such passing manoeuvres can be unsafe, also because the large size of the combine harvester 10 may block large portions of the view of the driver of the passing vehicle 96. It thus is of high importance that the driver of the combine harvester 10 becomes aware of the presence of a passing vehicle 96 as soon as possible, such that collisions can be avoided. With the system according to the invention, the driver of the combine harvester 10 will get an early warning of the presence of a nearby vehicle 96, even when it is not yet visible from the combine harvester driver cabin.

Preferably, the controller is further configured to determine not just the presence but also a position and/or a driving speed of the nearby vehicle 96 relative to the combine harvester 10, based on the received sensor signals. When knowing the exact position of the nearby, possibly passing, vehicle 96 relative to the combine harvester 10, this can, e.g., be shown to the driver on a display screen, thereby enabling the driver to steer or decelerate the combine harvester 10 in a safety-enhancing manner. By determining the driving speed of the nearby vehicle 96, the system is further enabled to differentiate between passing vehicles 96 and other objects or vehicles, such as parked cars or vehicles traveling in the opposite direction. In preferred embodiments, the controller is therefore further configured to generate the warning signal in dependence of the position and/or the driving speed of the nearby vehicle 96.

As described above, the radar-based residue monitoring system may be configured to operate in different modes, in order to optimise the system to detect specific types of objects, such as small and fast moving straw particles when in a spreader mode or large and slower moving nearby vehicles 96 when in a non-spreader mode. When in the field, it may be preferred to alternate between such modes in a coordinated fashion to make optimal use of all the technical capabilities of the radar-based residue monitoring system. On the road 400, no straw detection is needed and the non-spreader mode may be a more permanent road mode. The combine harvester 10 may further comprise a road travel detection system, configured to detect when the combine harvester 10 is driving on the road 400 and the activation of such a road mode would be desirable. The controller may thus be configured to automatically switch the radar-based residue monitoring system to the road mode when detecting that the combine harvester 10 is driving on the road 400. The road travel detection system may, e.g., comprise a video camera, a vibration sensor, or a geolocation sensor (such as a GPS sensor). Image recognition software may be used to detect the presence of nearby vehicles in video images captured by the video camera. Road surfaces are typically smoother than the agricultural fields wherein the combine harvester 10 performs its harvesting operations and are thus characterised by different vibration patterns that can be detected by one or more vibration sensors. Topographical data of the region where the combine harvester 10 is used may indicate the location of roads 400 and fields, thereby allowing the controller of the combine harvester 10 to switch the radar-based residue monitoring system to the road mode when the geolocation sensor indicates that the combine harvester 10 is driving on a road. Because the combine harvester driving speed on the road 400 will typically be higher than its driving speed in the field, also speed sensors may be used for determining when the combine harvester 10 is driving on a road 400. Preferably, a combination of different types of sensors is used for determining when to switch the radar-based residue monitoring system to the road mode.

The invention claimed is:

1. A combine harvester, comprising:

a chopper for chopping residue straw, a spreader system for spreading the chopped residue straw in an area behind the combine harvester, a radar-based residue monitoring system for monitoring a spreading distribution of the chopped residue straw, the radar-based residue monitoring system comprising one or more radar sensors, and a controller configured to:

control an operation of the radar-based residue monitoring system such that the one or more radar sensors emit radar signals with waveforms adapted for monitoring the spreading distribution of the chopped residue straw for a first number of cycles;

after the first number of cycles is complete, control the operation of the radar-based residue monitoring system such that the one or more radar sensors emit the radar signals with waveforms adapted for detecting vehicles for a second number of cycles;

receive sensor signals from the one or more radar sensors during the first number of cycles and the second number of cycles, based on the received sensor signals during the second number of cycles, detect a presence of a nearby vehicle, and generate a warning signal in dependence of the presence of the nearby vehicle.

2. The combine harvester as claimed in claim 1, wherein the controller is further configured to determine a position and/or a driving speed of the nearby vehicle relative to the combine harvester, based on the received sensor signals during the second number of cycles.

3. The combine harvester as claimed in claim 2, wherein the controller is further configured to generate the warning signal in dependence of the position and/or the driving speed of the nearby vehicle.

4. The combine harvester as claimed in claim 1, wherein the combine harvester further comprises a road travel detection system configured to detect when the combine harvester is driving on a road, the controller being configured to switch the radar-based residue monitoring system to a road mode when detecting that the combine harvester is driving on the road.

5. The combine harvester as claimed in claim 4, wherein the road travel detection system comprises at least one of:

a video camera, a vibration sensor, and a geolocation sensor.

6. The combine harvester as claimed in claim 1, wherein after the second number of cycles is complete, the controller is further configured to control the operation of the radar-based residue monitoring system such that the one or more radar sensors emit radar signals with the waveforms adapted for monitoring the spreading distribution of the chopped residue straw for the first number of cycles.

7. The combine harvester as claimed in claim 1, wherein the first number of cycles is greater than the second number of cycles.

8. A method of controlling a combine harvester, the method comprising:

controlling, with a controller, an operation of a radar-based residue monitoring system of the combine harvester such that one or more radar sensors of a radar-based residue monitoring system emit radar signals with waveforms adapted for monitoring a spreading distribution of chopped residue straw in an area behind the combine harvester for a first number of cycles;

after the first number of cycles is complete, controlling, with the controller, the operation of the radar-based residue monitoring system such that the one or more radar sensors emit the radar signals with waveforms adapted for detecting vehicles for a second number of cycles;

receiving sensor signals from the one or more radar sensors during the first number of cycles and the second number of cycles, based on the received sensor signals during the second number of cycles, detect a presence of a nearby vehicle, and generate a warning signal in dependence of the presence of the nearby vehicle.

9. The method of controlling a combine harvester as claimed in claim 8, further comprising determining, with the controller, in a position and/or a driving speed of the nearby vehicle relative to the combine harvester, based on the received sensor signals during the second number of cycles.

10. The method of controlling a combine harvester as claimed in claim 8, wherein the method further comprises detecting, with the controller, when the combine harvester is driving on a road, and switching, with the controller, the radar-based residue monitoring system to a road mode when the combine harvester is driving on the road.

11. The non-transitory, computer-readable storage medium storing instructions thereon that, when executed by one or more processors, cause the one or more processors to execute the method of claim 8.

12. The method of controlling a combine harvester as claimed in claim 8, further comprising:

after the second number of cycles is complete, controlling, with the controller, the operation of the radar-based residue monitoring system such that the one or more radar sensors emit radar signals with the waveforms adapted for monitoring the spreading distribution of the chopped residue straw for the first number of cycles.

13. The method of controlling a combine harvester as claimed in claim 8, wherein the first number of cycles is greater than the second number of cycles.

* * * * *